United States Patent
Bardwell

[11] 3,767,923
[45] Oct. 23, 1973

[54] PATTERN CONTOUR TRACING APPARATUS

[75] Inventor: Francis G. Bardwell, Elmhurst, Ill.

[73] Assignee: Stewart-Warner Corporation, Chicago, Ill.

[22] Filed: Mar. 29, 1972

[21] Appl. No.: 239,045

[52] U.S. Cl. ............................................ 250/202 R
[51] Int. Cl. .............................................. G05d 1/00
[58] Field of Search .................... 250/202, 203, 211; 318/31; 90/13.7

[56] References Cited
UNITED STATES PATENTS

| | | | |
|---|---|---|---|
| 3,431,425 | 3/1969 | Brown | 250/202 |
| 3,135,904 | 6/1964 | Purkhiser | 250/202 |
| 3,427,457 | 2/1969 | Domenico | 250/202 |
| 3,335,287 | 8/1967 | Hargens | 250/227 |
| 2,999,938 | 9/1961 | Hann | 250/202 |
| 3,609,373 | 9/1971 | Desai | 250/202 |
| 3,198,949 | 8/1965 | Holdo | 250/202 |
| 3,069,550 | 12/1962 | Neander | 250/202 |
| 3,566,129 | 2/1971 | Bardwell | 250/202 |
| 3,610,935 | 10/1971 | Von Voros | 250/202 |
| 3,528,337 | 9/1970 | Dulebohn | 250/202 |

Primary Examiner—James W. Lawrence
Assistant Examiner—D. C. Nelms
Attorney—Augustus G. Douvas et al.

[57] ABSTRACT

Line or pattern edge contour tracing apparatus incorporating a triangularly shaped pair of photocells receiving either direct or pulsating light from the line or edge to be traced. The triangularly shaped photocell pair carried by a sensing head are arranged in overlapping positions across the line or edge to be traced and across the direction of sensing head movement to enable the entire area of each cell to be used in sensing line displacement or orientation. Providing successive pairs of triangularly shaped photocells arranged across the line or direction of travel and in circuits for combining their outputs provides resultant signals indicative of the deviation of the sensing head from the line or edge being traced with the output of the cells selected and combined dependent on whether an edge or line is traced and the tracing speed for controlling servo motors to drive the sensing head along the line or edge. In addition the output of selected cells are controlled to ensure the sensing head properly orients to the line when tracing at slow speed.

8 Claims, 5 Drawing Figures

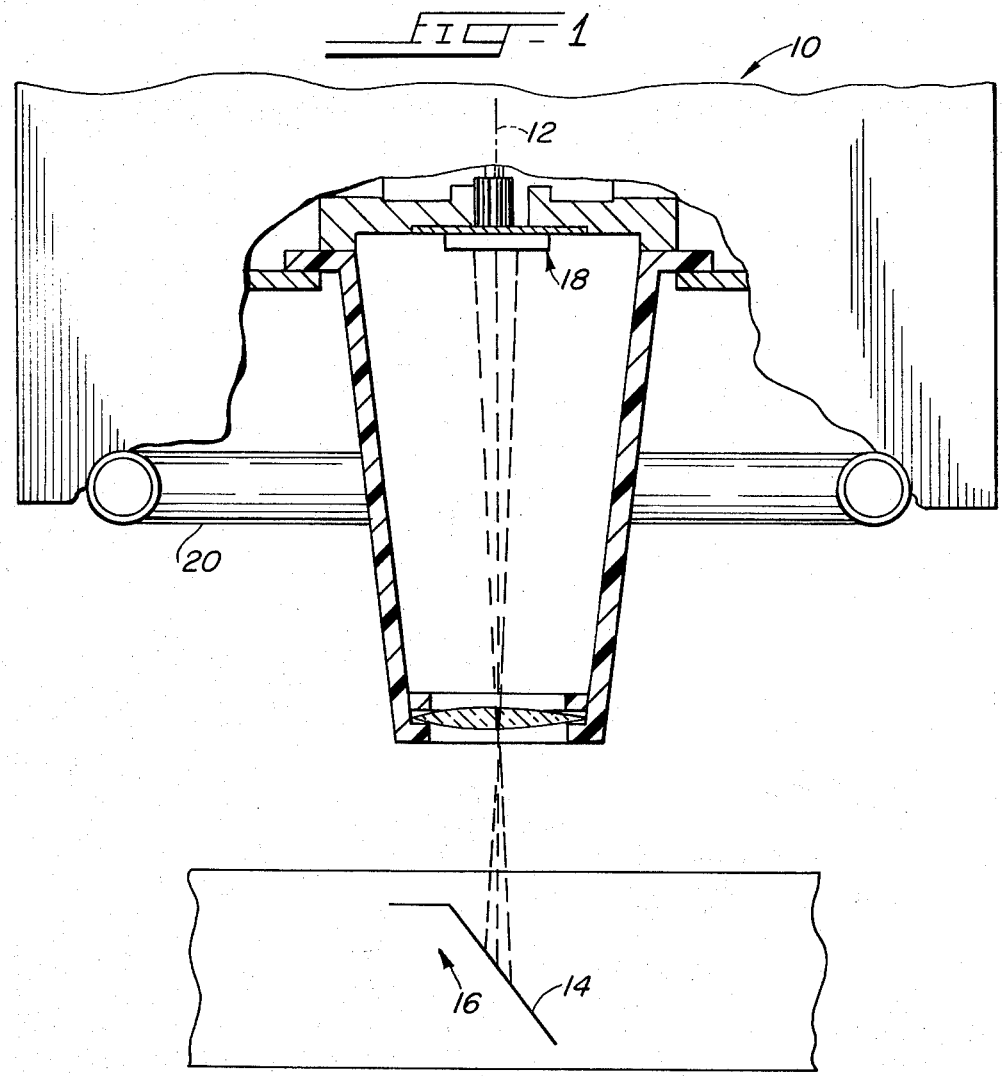

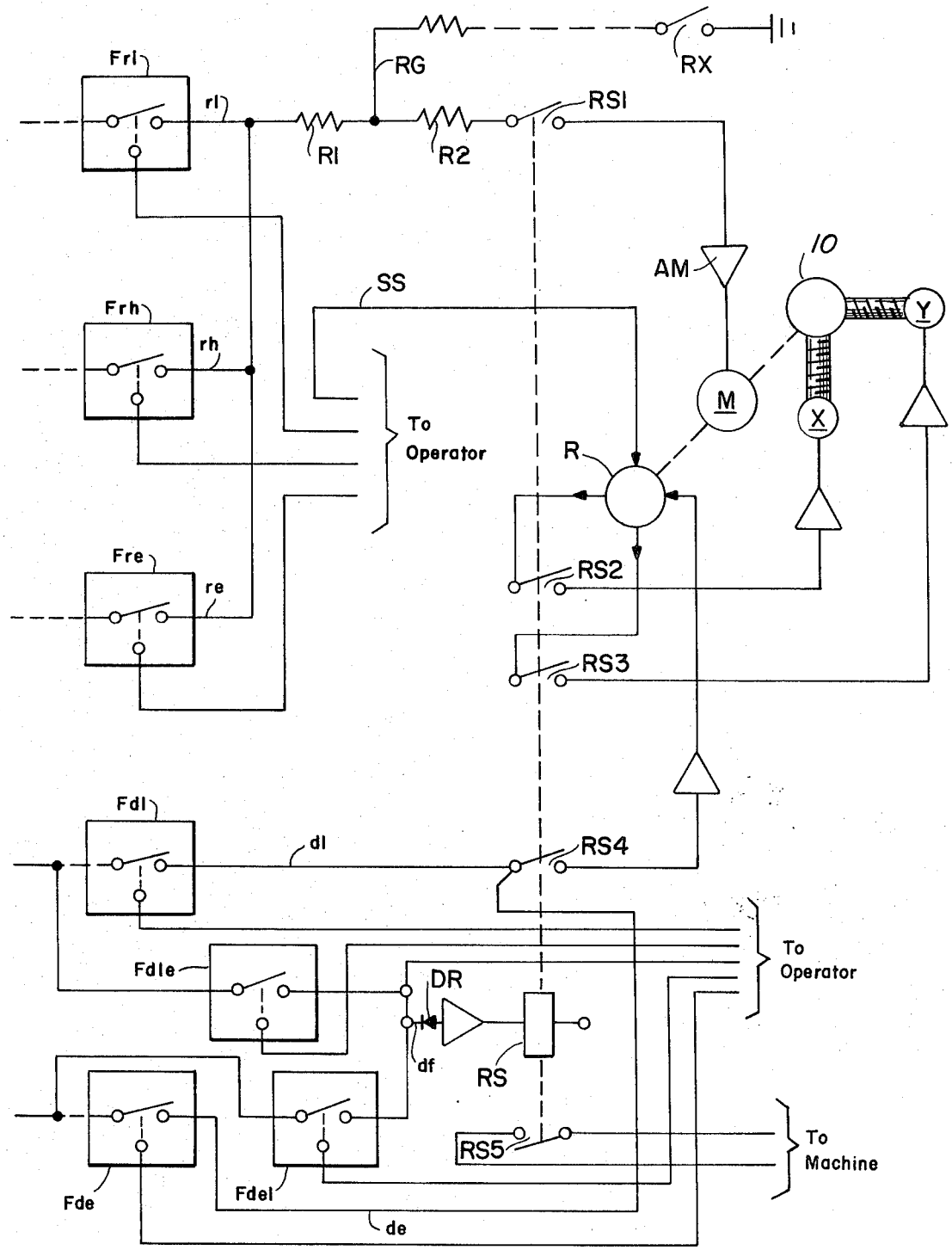

PATTERN CONTOUR TRACING APPARATUS

BACKGROUND OF THE INVENTION

1. Field of the Invention

This invention relates in general to pattern contour tracing apparatus for controlling machine operation or the like, and more particularly to a unique photocell and output arrangement for controlling the tracing apparatus and machine path to correspond to the pattern line or edge.

2. Description of the Prior Art

Automatic pattern contour tracing apparatus incorporates a sensing or steering head which carries a plurality of photocells together with a lamp for illuminating the pattern line or edge. Such apparatus is described in U.S. Pat. No. 3,423,589, and a sensing head for use in such apparatus is described in U.S. Pat. No. 3,704,373, dated Nov. 28, 1972. In such apparatus the photocells sense the position of the illuminated line or edge to control a steering servo motor, which rotates the head to maintain the cells angularly oriented relative the line or edge and a pair of coordinate drive motors which maintain the head positioned over the line and drive it in a desired direction along the line, together with any cutting, sensing or welding apparatus which is controlled to operate in accordance with the pattern contour represented by the line.

The photocells generally present a rectangular cross section to the line or edge image and are arranged on opposite sides of the line. This creates a dead space between the cells in which a shift in the line or edge position may not be immediately detected.

Further, the width of the line limits the effective area of the cell providing useful signals. For example, a typical line is 1/32 inch or 0.032 inch wide. If approximately one-half the line is seen by each cell, each cell is effective to sense only 1/64 inch or only one-half the line width. Thus, as the line moves toward one cell or the other, one cell output increases while the other decreases. The signal outputs are generally algebraically subtracted so that the negative going signal of one cell is added to the positive going signal of the other cell until the line edge hits the dead space between the cells; whereafter, no further increase in signal is provided from one cell, while the output from the other cell shortly thereafter fails to decrease. The effect is to limit the effective change in signal for displacement of the line to substantially one-half the line width of 1/64 inch. The effective cell dimension transverse to the line is therefore limited to 1/32 inch since as soon as the line is seen by only one cell, no signal change occurs and as the line moves past the cell the signal simply drops off.

SUMMARY OF THE INVENTION

The present invention overcomes the foregoing problem by employing a photocell pair arrangement having triangularly shaped areas exposed to the line image with the area of each cell overlapping the other and the line along the line. The apexes of the triangularly shaped areas face in opposite directions so that wide changes in the area of light on each cell occur in opposite directions in response to deviation in the position of the line, while the overlapped position of the cells enables a signal change to occur in both cells over the entire width of the line to thereby double the length of the signal change and eliminate the dead spot between the cells. By providing a plurality of pairs of such cells in an array having overlapped spaced positions along the line and by combining the outputs thereof together with the outputs of a pair of cells located on respective sides of the array, the sensing head carrying the array is adapted for use in either fast or low speed line tracing or for use in edge tracing.

It is therefore an object of this invention to provide an improved photocell arrangement for use in either line or edge tracing.

It is a further object of this invention to provide an array of photocells and combine the outputs thereof for use in either fast or low speed line tracing or edge tracing.

Other objects and advantages of this invention will be readily apparent from the following description together with the claims and accompanying drawings.

BRIEF DESCRIPTION OF THE DRAWINGS

FIG. 1 is a vertical sectional largely schematic view of a scanning head showing the illuminating, optical and photosensitive means therein for scanning a pattern contour;

FIG. 2 is a plan view of a photocell group utilizing triagular areas;

FIG. 3 is a graph illustrating the character of the signal derived from the photocells illustrated in FIG. 2; and FIGS. 4 and 4a illustrate the manner in which the outputs of an array of photocells such as illustrated in FIG. 2 are combined to provide line tracing at selected speeds or edge tracing.

DESCRIPTION OF THE PREFERRED EMBODIMENT

Figure 4:
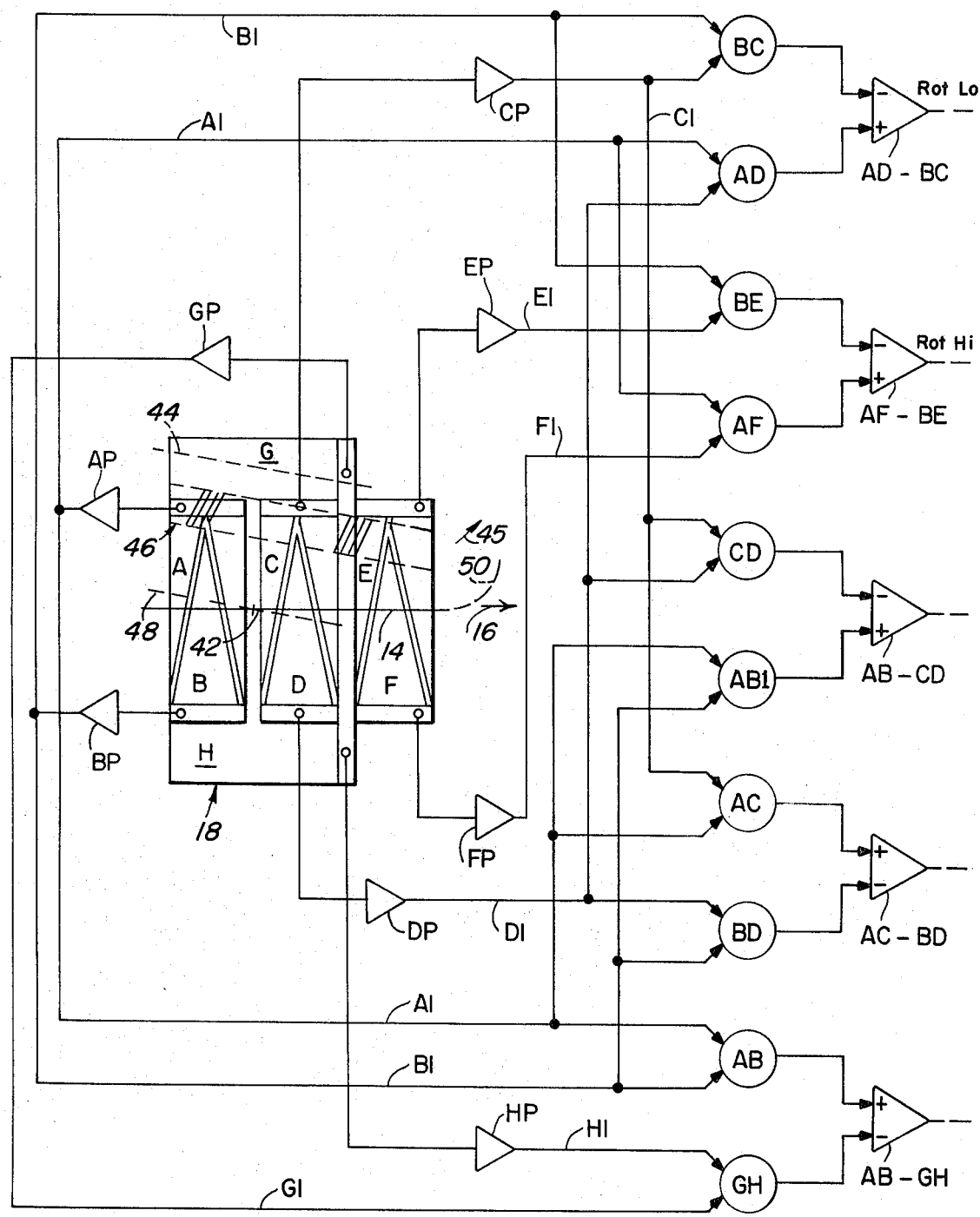

In FIG. 1 a portion of a steering head or sensing head 10 also known as a scanning head or tracer described in U.S. Pat. application Ser. No. 185,282, is shown in largely schematic form. The head 10 is rotatable about an axis 12 by a coaxial steering servo motor M seen in FIG. 4 and is driven along a pattern contour line such as line 14, which may be taken to represent either a drawing line or a pattern edge, by a pair of coordinate drive servo motors X and Y indicated in FIG. 4.

The servo motors X and Y drive the head 10 together with the machine to be controlled in correspondence with the pattern in respective directions through respective lead screws, to provide a resultant head direction indicated by arrow 16 corresponding to the selected direction in which head 10 follows the line 14 or edge. The servo motors X and Y are controlled by a resolver R in accordance with a displacement error signal received by the resolver R from a photosensitive assembly 18 carried by the head 10. The displacement signal is conventionally combined by the resolver R with speed signals received over lead SS under operator selection and in accordance with the resolver angular position which is in turn controlled by the angular orientation signal provided by assembly 18 to the steering motor M to drive the X and Y motors at respective speeds for following line 14 in the desired direction.

A neon lamp 20 carried by head 10 is conventionally pulsed to provide fluctuating light for illuminating the edge or line 14, although incandescent lamps and/or d.c. energization may be used. An optical system including lens 22 projects an image of the pattern contour, which is represented by line 14, on the photosensitive assembly 18 to produce an electrical output dependent upon the image location to control the steering motor M and the X and Y motors.

A simplified form of photosensitive assembly 18 is shown in FIG. 2 and comprises two photosensitive cells or areas 24 and 26. The area 24 is in the shape of an isosceles triangle whose equal sides are parallel to and substantially coextensive with the respective hypotenuse of two right triangles forming area 26 so that the apex of each triangle is located on opposite sides of line 14 whose center is indicated by arrow 16. Thus, each area is defined by edges diverging in opposite directions for overlapping the line 14. The height of the triangles is defined by the longer leg 28 of the right triangles forming area 26 and is arranged perpendicular to the direction of travel indicated by arrow 16 so that the height of each triangle normally overlaps the line equally with the base line 29 of each cell 24 and 26 located an equal distance from the line center and normally parallel to the direction of travel.

In this case the photosensitive areas 24 and 26 comprise photovoltaic cells which are appropriately separated along the adjacent legs; however, photoresistive cells may also be used. A conductive layer such as silver or copper foil 30 is conventionally solder plated to respective surface portions of each cell 24 and 26 adjacent the respective base line and outside of the triangular areas, and a similar foil (not shown) is plated to the opposite surface of each cell to develop an appropriate output signal from each cell.

With the described pair of photosensitive cells 24 and 26 each overlapping the line 14, there is no dead space between the cells. The line 14 is a drawing, it is normally 1/32 inch or 0.032 inch wide and its center, indicated by arrow 16, normally bisects each triangular area and the legs, including the legs 28. The height of each triangle along leg 28 is three times the width of the line 14 so that each cell is 3/32 inch or 0.120 inch wide with 1/32 inch exposed on opposite sides of the line. Since the area of the cells 24 and 26 are equal and each is exposed to an equal amount of light, when the line 14 is centered, the two outputs combined provide a new output of zero at that time, as shown at 32 in FIG. 3. If the line 14 represents an edge, the edge image falls along a line corresponding to the center of line 14 indicated by arrow 16 and again the area of one cell 24 exposed to light equals the area blocked in the other cell 26 by the pattern so that the combined signals provide a zero output indicated at 32 in FIG. 3. It will be appreciated that the signals may be added together and subtracted from a reference signal or otherwise combined.

As the line 14 moves to the right, for example, the output of cell 24 linearly increases, while the output of cell 26 linearly decreases to provide a positively swinging signal output indicated at 34 in FIG. 3 for application to the steering motor M, the resolver R and the X and Y motors for controlling the head 10 accordingly. Similarly, if the line 14 moves to the left or clockwise, the output of cell 24 linearly decreases, while cell 26 increases to provide a negatively swinging impulse as indicated at 36 in FIG. 3 for application to the motors M, X and Y for aligning the head 10 with the line. Since the cells 24 and 26 are each affected by movement of the line or edge along the entire length of leg 28, the output signals 34 and 36 are provided for a movement of the line equal to leg 28 minus the width W of line 14. Thus, the signal output changes in each direction 34 or 36 over one-half of leg 28 minus the line width of (L-W)/2; whereafter, if the line starts to move off the sensitive cell area, the signal falls as indicated at 38 in FIG. 3. If the center of line 14 represents a pattern edge, a slightly greater signal range is obviously provided. Thus, the available signal change is substantially greater than the signal change available if the cells are aligned side by side or on opposite sides of the line center represented by arrow 16.

Referring now to FIG. 4, a practical photocell assembly for use with a high speed tracer of the type described in the aforementioned application is indicated therein by the reference character 18. The assembly 18 comprises a plurality of pairs of photosensitive or photovoltaic equal area cells identified as A and B, C and D, E and F arranged as described for cells 24 and 26. The cells A—F are carried by the head 10 in a stacked coplanar array with one cell of each pair being an isosceles triangle and the other cell arranged as a pair of right triangles with each hypotenuse adjacent but separated from a respective leg of the isosceles triangle. Legs 28 corresponding to the height of each triangular area are arranged perpendicular to the theoretical direction of head travel indicated by arrow 16. The head 10 is either or both rotated or moved in the X and Y direction to align the direction of travel 16 with the line 14 in response to so-called error signals from the cells. The actual axis of rotation of the head 10 lies along a line intermediate cells A and C and offset from line 14 by a distance corresponding to the kerf adjustment. Thus, axis 42 lies intermediate cells A and C on a line corresponding to line 14 bisecting the area and legs of each triangle with the base legs of the triangle arranged parallel to line 14. Thus, with the head 10 traveling in direction 16, cells E, F, C and D sense a change in direction of line 14 with cells A and B.

In addition, rectangular photosensitive or photovoltaic cell G or H equal in area to cells A or B for sensing are arranged adjacent a respective base line of cells A and B, with the cells G and H extending from a position coincident with the initiation of cell A to a position adjacent the adjacent ends of cells D and E.

A foil electrode is provided along a small area adjacent the base line of each triangular area and a small portion of rectangular cells G and H to permit the connection of a respective lead from each cell to a respective preamplifier AP—HP. Electrodes at the opposite cell surfaces are connected in common or to ground. Leads A1 - H1 extend from respective preamplifiers AP—HP to conventional summing networks AB, AB1, AC, AD, AF, BC, BD, BE, CD and GH with the letters identifying each network serving to identify the cell feeding the network. The summing networks, as for example explained in the aforementioned patent, serve to add the cell output signals although they can also be subtracted.

The outputs of the summing networks AB—GH are applied to respective conventional difference amplifiers indicated at AB-GH, AB-CD, AC-BD, AD-BC and AF-BE, which amplify the respective differences in signal level between the summing networks with the letters identifying the combined cell outputs. The output from the respective difference amplifiers AB-GH...AF-BE are applied over respective leads through respective conventional demodulators, detectors and amplifiers to conventional FET circuits Fde-Frh.

The FET circuits F*de* and F*de*1 are fed by amplifier AB-GH and in turn feed the displacement edge lead *de* and line or edge start lead *df*, respectively. The FET circuits F*d*1 and F*d*1*e* are fed by amplifier AC-BD and in turn feed the displacement line lead *d*1 and the edge start lead df, respectively. The FET circuits F*r*1, F*rh*, and F*re* are fed by amplifiers AD-BD, AF-BE and AB-CD, respectively, and in turn feed low rotation lead *r*1, high rotation lead *rh* and edge rotation lead *re*, respectively, which in turn are applied through a resistor network R1 and R2, an amplifier AM and contacts RS1 of a start relay RS to the steering motor M of the sensing head 10.

The displacement edge lead de and displacement line lead *d*1 extend to the resolver R through contacts RS4 of the start relay RS, which also connects the resolver output to motors X and Y through respective amplifiers at contacts RS2 and RS3. The start lead *df* feeds the start relay RS through an amplifier to initially sense the line or edge, respectively. Relay RS also controls contacts RS5 to start the cutting apparatus which is to cut a pattern corresponding to the edge or line 14.

It will be appreciated that additional circuits such as those for the lamps, filter and detector circuits and for operating the motors directly under the control of the operator are not shown and that the relay contact and amplifier arrangement may be varied from that shown since these are conventional.

The FET circuits operate as switches and analog amplifiers and are selected by the operator in accordance with the mode of operation. Thus, if the steering head 10 is to trace a line such as 14, the operator selects F*d*1 and F*de*1 over respective leads together with either F*r*1 or F*rh*, depending on whether tracing is to be at low or high speed. If the steering head 10 is to follow an edge, the operator renders F*de* and F*d*1*e* effective together with F*re*. Since tracing of an edge is generally carried out at a single speed range, there is no need to provide a speed selection for this mode of operation. The gain reduction network R1 and R2 is used only to find the line 14 when tracing at low speed and is rendered effective by the operator at lead RG.

Thus, assuming it is desired to trace line 14 representing a drawing at a relatively low speed, the operator sets the kerf adjustment, selects FET circuits F*d*1 and F*de*1 together with F*r*1 and selects appropriate speeds for the X, Y coordinate motors. He also operates the lamp 20 and the conventional switches to drive the head 10 towards the line 14 with the head oriented towards line 14 and direction 16 by appropriate operation of the X and Y motors, or he manually moves the head 10 over the line 14 while orienting the head in the tracing direction 16. If desired, he also renders the gain reduction network R1 and R2 effective by operating switch RX to place a suitable shunt on lead RG and reduce the output applied to the steering motor M through amplifier AM.

As the head 10 approaches the line 14, which for example may be initially oriented as indicated by broken lines 44 relative the direction of actual head movement indicated by arrow 45, the photocell G initially senses the line. The output of cell G falls to reduce the signal level from network GH and provide a positive going signal from amplifier AB-GH, which is applied to lead *df*, but blocked from the start relay RS by rectifier DR. As the head 10 continues, it approaches closer to the line as is indicated by line 46. The light intensity falling on cell G is increased since the line image no longer falls on it, and cell G provides a corresponding output on lead G1 which is algebraically added to the output of cell H at summing network GH to thereby provide a large signal output to difference amplifier AB-GH which is subtracted from the signal provided by cells A and B to network AB. Since the line falls on cells A, the output signal of cells A and B at this time from network AB is low and amplifier AB-GH provides a large negative going signal from F*de*1 to lead *df* for operating relay RS.

Relay RS closes contacts RS1 to connect the output of F*r*1 to the steering motor M, contacts RS4 to connect the output of F*d*1 to the resolver R, contacts RS2 and RS3 to connect the resolver output to the coordinate motors X and Y and contacts RS5 to initiate the welding or cutting operation to be controlled in accordance with the pattern contour represented by edge or line 14.

The signal on leads *rh* and *d*1 is now connected to steering motor M and resolver R, respectively, as motors X and Y move the cells A and C over the line as indicated at 46. The reduction in light on cells A and C creates a change in signal output from network AC, while similar signal changes are provided by summing networks AD and BC, since the cells B and D sense more light at this time than cells A and C. The difference amplifier AC-BD, therefore, provides an error displacement signal representing the difference in light seen by B and D over that seen by cells A and C for application to F*d*1 over lead *d*1 to the resolver R to operate the X and Y motors for driving head 10 toward the line.

In the meantime, with line 14 positioned as indicated at 46, cell C sees considerably less light than cell D, while cell A also sees less light than cell B, the total light seen by A+D is greater than that seen by B+C. The output of network BC, therefore, becomes unbalanced relative network AD and amplifier AD-BC supplies a corresponding output through network R1 and R2 to the steering motor M. Motor M now rotates the head counterclockwise relative axis 42 which tends to orient the arrow 16 perpendicular to the line. This counterclockwise direction at this time is opposite to that in which the head would normally orient if the line were centered on the axis 42. Normally the reaction of motor M takes place quite rapidly, and the steering head motor M may rotate the head in a counterclockwise direction. To avoid this situation, the gain reduction network lead RG is rendered effective by operation of switch RX to reduce the signal supplied by amplifier AM to motor M when finding the line at low speed. The motor M will then operate slowly, while the X and Y motors are operating to bring the line over cells A and B through the displacement amplifier AC-BD to ensure normal centering of the line 14 in the direction 16 on axis 42. As the head 10 proceeds towards the line now indicated at 48, the line image falls on all the cells A, B, C and D and cell D senses less light than cell C in accordance with the position of line 48 while cell A senses less light than cell B. The steering motor M receives a signal of corresponding orientation from amplifier AD-BC which is opposite that previously received and starts to rotate the head 10 clockwise relative axis 42 to align arrow 16 parallel to line 48 and thereby equalize the light sensed by cells A and C. As the head 10 centers axis 42 over the line 14, which may be located at 14, the output of cells A and C equalizes with cells B and D to control the output of amplifier AC-BD accordingly. The output of amplifier AC-BD applied to the resolver R through Fde controls motors X and Y accordingly so that the head 10 moves along the line 14 in the direction 16 with the direction 16 being the resultant of the vector movement provided by motors X and Y. The operator notes the automatic head movement and renders lead RG ineffective. The gain of amplifier AM is restored to normal and the steering motor M maintains the head 10 angularly oriented on the line in response to the difference in light sensed by cells A and C or B and D, as explained, and controls the resolver output accordingly.

If the head 10 approaches the line 14 in the opposite direction, cells H, B and D sense the line first; however, the principles of operation remain the same. If the head were manually moved approximately over the line and faced in the direction of movement, the relay RS is operated, since the signal level at cells A and B is less than G and H and the center of the line is found by head 10 by the displacement error signal provided by amplifier AC-BD and the rotational error signal provided by amplifier AD-BC.

As th head 10 moves along the line 14, any angular deviation in the line creates a signal difference between cells A+D compared with cells B+C at amplifier AD-BC for operating the motor M in the appropriate direction. When the line 14 curves, as indicated at 50 for example, the portion 50 will be sensed first by a disturbance in the light balance received by cells C and D with either one or the other receiving greater light and the other less light to alter the output of networks AD and BC accordingly. This output varies the output of amplifier AD-BC in a direction corresponding to the line deviation for in turn rotating the steering motor M to rotate the head 10 for maintaining the head angularly oriented with the line and controlling the resolver output to motors X and Y for following the line. Displacement of the line relative the axis 42, as explained, creates an unbalance in the output of cells A and C relative cells B and D so that the resulting output of amplifier AC-BD is fed through the resolver R to control the X and Y motors to compensate for the displacement.

If the line 14 is to be traced at high speed of, for example 120 inches per minute, the FET circuit Frh is rendered effective instead of Frl. In addition, circuit Fd1 and circuit Fde1 are rendered effective to operate the X and Y motors as soon as relay RS is operated in response to sensing the line 14, as previously explained. The gain reduction network lead RG is not used in this case since the X and Y motors are operated at a substantially higher speed so that cells A, B, E and F are over the line before the steering motor M can rotate the head too far in the wrong direction. Cells E and F are not effective at amplifier AF-BE in place of cells C and D for sensing rotation while cells C and D are only used for displacement signals at amplifier AC-BD.

The signal developed by cells A and C compared with the signal from cells B and D at networks AC and BD provides a displacement error signal from amplifier AC-BD to drive the motors X and Y for moving the head into alignment with line 14. It is therefore unnecessary to use the gain control lead RG at high speed scanning. Since the motor speed is high, the steering head 10 does not have a chance to turn perpendicular to the line during the time the relay RS is rendered operative and the time the image falls totally on the cells, especially since the relay takes time to turn on.

Thus, cells A and B together with cells G or H sense the line position under head 10 to operate relay RS as previously explained, which in turn connects the output of lead Frh to the steering motor M, and the output of Fd1 to the resolver R for controlling the X and Y motors to center axis 42 over the line. If cell E now senses less light than cell A, the output of network BE is less than network AF to provide a change in output signal at amplifier AF-BE. Amplifier AF-BE in turn applies this signal difference over lead rh to the steering motor M to rotate the head 10 counterclockwise for aligning the head with the line. If the signal appearing at network AF is less than network BE, on the other hand, the steering motor M is operated in the clockwise direction relative axis 42 to correct for the angular misalignment between axis 42 and the line.

Since cells E and F are displaced from axis 42 by a distance corresponding to the dimensions of cells C and D along the line, the steering motor M receives a signal from amplifier AF-BE in the event the line curves, as shown at 50, some distance prior to the alignment of portion 50 with axis 42. The steering motor M therefore rotates the head toward portion 50 to align the direction of head movement 16 with portion 50 before the arrival of axis 42 at portion 50 to thereby overcome any tendency of the head to overshoot the line, while the X and Y motors are operating at high speed. The scanning of the line 14 for displacement proceeds as described for low speed line tracing with the exception that cells E and F are used to determine angular orientation as already mentioned.

For edge tracing the FET circuits Fd1e, Fde and Fre are activated by the operator, while the X and Y motors are operated by the operator to drive the steering head 10 toward the edge, which may thereafter occupy positions corresponding to that shown for lines 44 or 46. Cells G or H will first sense the edge and the output of that cell will fall accordingly; but the start relay RS does not operate until Fd1e recieves an output from amplifier AC-BD resulting from a fall in light sensed by cells A or C or B or D, depending on the direction in which the head approaches the edge. Assuming then that the head approaches the pattern edge to cause cells A or C or both to sense the line, amplifier AC-BD, this will provide an output through Fd1e and lead df for operating relay RS.

Relay RS connects the output of amplifier AB-GH through Fde to the resolver R and the output of amplifier AB-CD through Fre and lead re to the steering motor M. Motor M is then rotated in accordance with whether the total output of cells A+B at network AB1 corresponds to the total output of cells C+D at network CD to angularly align the head with the pattern edge. Simultaneously, since the pattern will overlie all of either cells G or H together with a portion of cell A and cell B, the output of network AB will be unbalanced from that of network GH, as the axis 42 is displaced from the pattern edge, a displacement error signal is provided to lead de and through the resolver R to drive the X and Y motors for aligning the direction of travel 16 with the pattern edge indicated at 14. At that time the output of cells A+B equals G+H equalizes and the X and Y motors simply operate under the selected speed signals to follow the pattern edge in accordance with a change in output from either cells A, B, C and D.

It will be appreciated that although triangular cell shapes are shown under some circumstances, masks may be used on the photocells to provide triangular sensitive areas and by the use of mirrors the cells may be located in other head positions than those shown.

The foregoing constitutes a description of improved line tracing apparatus whose inventive concepts are believed set forth in the accompanying claims.

What is claimed is:

1. A photosensitive arrangement carried by a movable scanning head for controlling the position of said head relative a contour line defining either a pattern edge or a drawing line, the improvement comprising a first pair of photosensitive cells carried by said head with each cell having an equal light sensitive area of triangular configuration for movement with said head into a position overlapping said line, one cell triangular area defined by an isosceles triangle and the other cell triangular area defined by two right triangles each having a hypotenuse adjacent and substantially coextensive with a respective one of the equal legs of said isosceles triangle, and means for projecting an image of said line on said cells in response to movement of said cells into said overlapping position whereby said cells provide equal output signals in response to the projected image of said line dividing each area into equal portions and unequal output signals in response to the projected image of said line dividing each area into unequal portions.

2. The photosensitive arrangement claimed in claim 1 in which said head is rotatable by one motor to maintain said head in a predetermined angular position relative said line and said head is moved longitudinally along said line by a pair of coordinate drive motors, the improvement comprising a second pair of said cells each having an area of triangular configuration corresponding to a respective one of said first cells and said head has an axis of rotation lying between said first and second pairs of cells and along a line bisecting each triangular area, first means for combining the output signal from each cell of said one pair with a signal from each respective cell of the other pair for determining the displacement of said line image from said bisecting line, and second means for combining the output signal from each cell of said one pair with a signal from each respective other cell of the other pair for deriving a first signal corresponding to the angular orientation of said image relative said axis at a position spaced from said axis along the direction of head movement.

3. In the arrangement claimed in claim 2, a pair of serially connected resistors with one of said resistors connected to said means for combining said signals to derive a first signal corresponding to the angular orientation, an amplifier having an input connected to the other one of said resistors and an output connected to said one motor for rotating said head, normally ineffective means connected between said resistors for reducing the signal applied to said amplifier from said resistors for reducing the rate at which said one motor rotates said head, and manually operable means for rendering said ineffective means effective to reduce the signal applied from said resistors to said amplifier input for reducing said rate of rotation.

4. In the arrangement claimed in claim 2, a third pair of cells each having an area of triangular configuration corresponding to a respective one of said first and second pair of cells with said second pair of cells spaced intermediate said first and third pair of cells, means for combining the output signal of each cell of said first pair of cells with the output signal of a cell of said third pair to derive a second signal corresponding to the angular orientation of said image relative said axis at a position spaced from said axis along the direction of movement, and manually operable means for connecting either said first signal or said second signal to said one motor for rotating said head in accordance with the speed of said coordinate drive motors.

5. In the arrangement claimed in claim 2, an additional pair of cells of equal area each spaced adjacent a respective end of said first cell pair in a direction transverse to said line image, means for combining the outputs of said additional pair of cells with each other, means for combining the outputs of said first pair of cells with each other, and means for combining the combined signals of said additional and first pairs of cells for driving said coordinate motors in response to said contour line defining a pattern edge with one cell of said additional pair of cells overlapping the pattern forming said edge.

6. In the arrangement claimed in claim 5, means for combining the outputs of said second pair of cells with each other and with the combined signal of said first pair of cells for determining the angular orientation of said pattern edge relative said axis.

7. In the arrangement claimed in claim 6, a start relay operated for initiating control of said motors by said cells, manually operable means for selecting the combined outputs of said additional and first pair of cells for operating said start relay in response to said contour line defining a drawing line, and manually operable means for selecting the combined outputs of each cell of said first pair with a respective cell of said second pair to determine line displacement for operating said start relay in response to said contour line defining a pattern edge.

8. In a scanning system of the type having a scanning head carrying a plurality of light sensitive cells for sensing the presence of a contour line, a steering head motor for rotating said head and cells in response to a signal from said cells for enabling said cells to be positioned in overlapping relationship to said contour line and at a predetermined angle to said contour line from a position offset from said line for thereafter following said line at said angle, a pair of coordinate drive motors for moving said head to and longitudinally along said line under control of said steering head motor, an amplifier for amplifying the signal derived from said cells for application to said steering motor, a pair of serially connected resistors for transmitting said signal to said amplifier for enabling said amplifier to control said steering motor to rotate said head and cells to said predetermined angle in response to said cells being moved from said offset position to one overlapping position relative said line, normally ineffective means connected between said resistors for reducing the signal provided to said amplifier for reducing the rate of rotational movement of said steering head motor during movement of said head from said offset position into said one overlapping position, and manually operated means operated for rendering said normally ineffective means effective to reduce said signal during movement from said offset position to said one overlapping position and thereafter restored to render said signal reducing means ineffective.

* * * * *